Feb. 17, 1925.

A. P. ENGLISH

PERCOLATOR

Filed May 7, 1924

1,526,745

INVENTOR
A. P. English
BY
ATTORNEYS

Patented Feb. 17, 1925.

1,526,745

UNITED STATES PATENT OFFICE.

ANDREW PEYTON ENGLISH, OF JACKSONVILLE, FLORIDA.

PERCOLATOR.

Application filed May 7, 1924. Serial No. 711,654.

*To all whom it may concern:*

Be it known that I, ANDREW PEYTON ENGLISH, a citizen of the United States, and a resident of Jacksonville, in the county of Duval and State of Florida, have invented certain new and useful Improvements in Percolators, of which the following is a specification.

This invention relates to percolators and is more particularly directed to a device for forcing any liquor that remains in the grounds in the usual perforated container of a percolator from the grounds and into the bottom of the percolator, thus making it possible to obtain the additional liquor after the percolation has been completed.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

Figure 1:
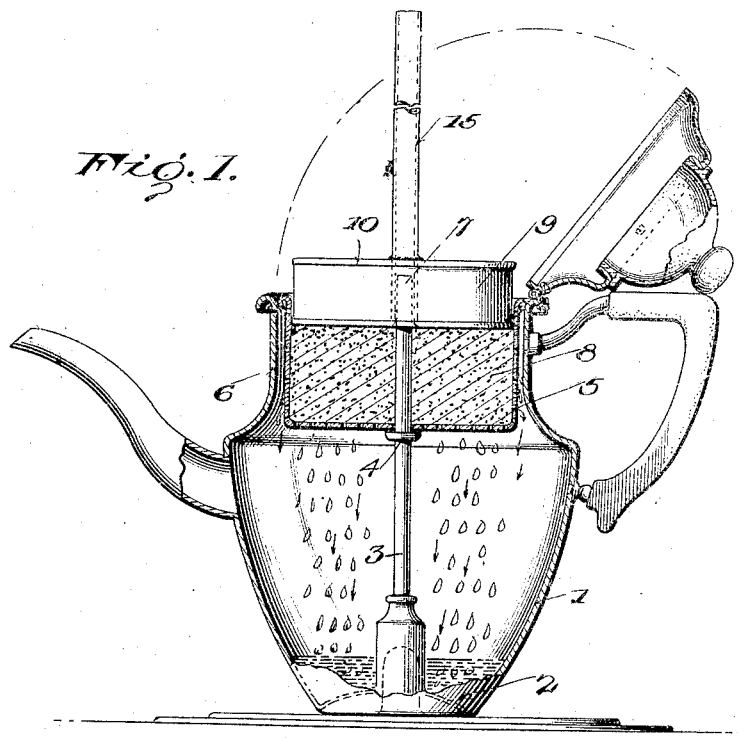
Figure 1 is a sectional view of a percolator showing my invention applied.
Figure 2:
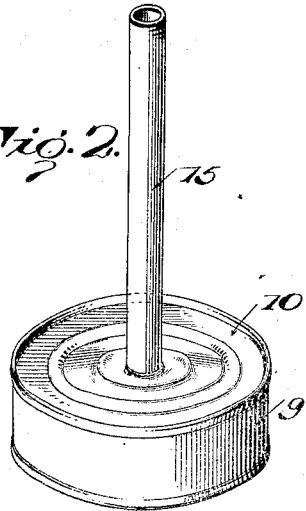
Figure 2 is a view in perspective of my coffee presser.
Figure 3:
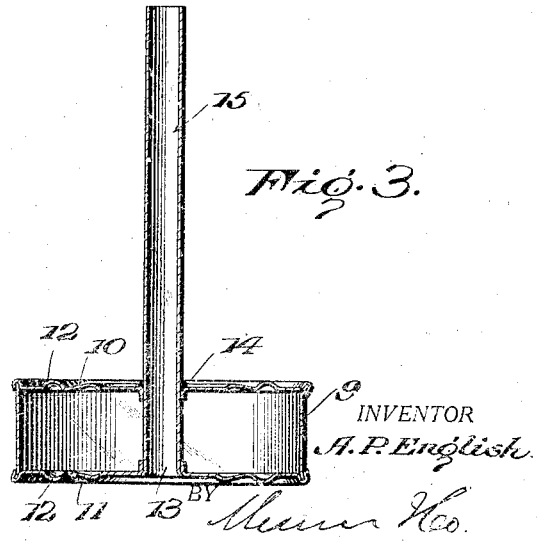
Figure 3 is a vertical sectional view of the presser.

Referring more particularly to the drawings, 1 designates the coffee pot which is adapted to be partially filled with water to cover a concave disc 2 which is secured to a hollow percolating stem 3. The stem is provided with a shoulder 4 for supporting a perforated container 5 adapted to receive the usual coffee grounds and this container is located within the narrow neck 6 of the pot. The upper end 7 of the percolating tube 3 projects above the level of the coffee grounds 8 so that when heat is applied to the bottom of the pot the water below the disc 2 will be heated sufficiently to force the drops of water upwardly through the tube 3 and out of the upper end 7 of said tube and onto the grounds 8. This water eventually percolates through the grounds and passing through the openings in the bottom of the casing 5 again flows to the chamber to the lower end of the pot 1.

During the process of percolation the liquid quite considerably saturates the grounds 8 and maintains some of the liquid in the container 5.

In order to force such liquid from the grounds after the process of percolation has stopped, I employ a hollow cylindrical drum 9 having upper and lower ends closed respectively by the plates 10 and 11. These plates, if desired, may be provided with annular ribs 12 whereby the base plate 11 will engage the upper layer of grounds and aid in forcing the grounds into a more compact mass for eliminating the liquid from the grounds. Any form of disfigured surface may be employed for the base member 11. The center of the base 11 is provided with a perforation 13 while the top member is likewise provided with a perforation 14 aligned with the perforation 13. A tubular handle 15 is adapted to be inserted through the perforation with the lower end of the handle terminating at the base member 11 and sealed to the same. The periphery of the metal of the top 10 at the periphery of the opening 14 is sealed to the tubular member 15 in any approved manner as by soldering or brazing.

In applying the device to the grounds in the container 5 of the pot 1 the tubular member 15 is slipped over the upper free end 7 of the percolating tubes 3 and the handle is then firmly grasped and the drum is forced downwardly on the grounds 8 with sufficient pressure to force out all the liquid from the grounds without injuring in any way the container 5. In this way the liquor still contained in the grounds is forced down with the other liquor after the pot has been removed from the fire or the heat has been withdrawn and the percolation has ceased.

What I claim is:

1. A device for forcing liquor from coffee grounds in a percolator comprising a cylindrical drum having its opposite ends provided with centrally disposed passages and a tubular handle mounted in the central passages and sealed to the opposite ends of the drum.

2. In a coffee percolator having an elevated receptacle for coffee grounds and a percolating tube extending through and terminating within the receptacle, a presser for forcing liquor from the grounds and comprising an air-tight drum adapted to fit within said receptacle, a tubular handle having its lower end located within the drum and terminating at the bottom of said drum, said handle adapted to receive the percolating tube, the top and bottom of the drum where the handle passes through the same being sealed to the wall of the handle.

ANDREW PEYTON ENGLISH.